July 2, 1963  J. W. ALBRIGHT ET AL  3,096,391
BUS DUCT CONNECTION

Filed Dec. 27, 1960  3 Sheets-Sheet 1

Inventors,
John W. Albright,
Ernest E. Bianco,
by Gilbert P. Tarleton
Their Attorney.

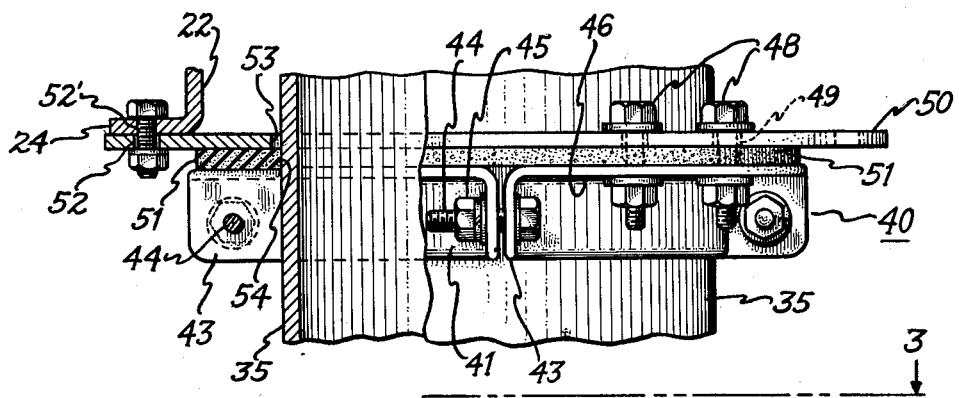
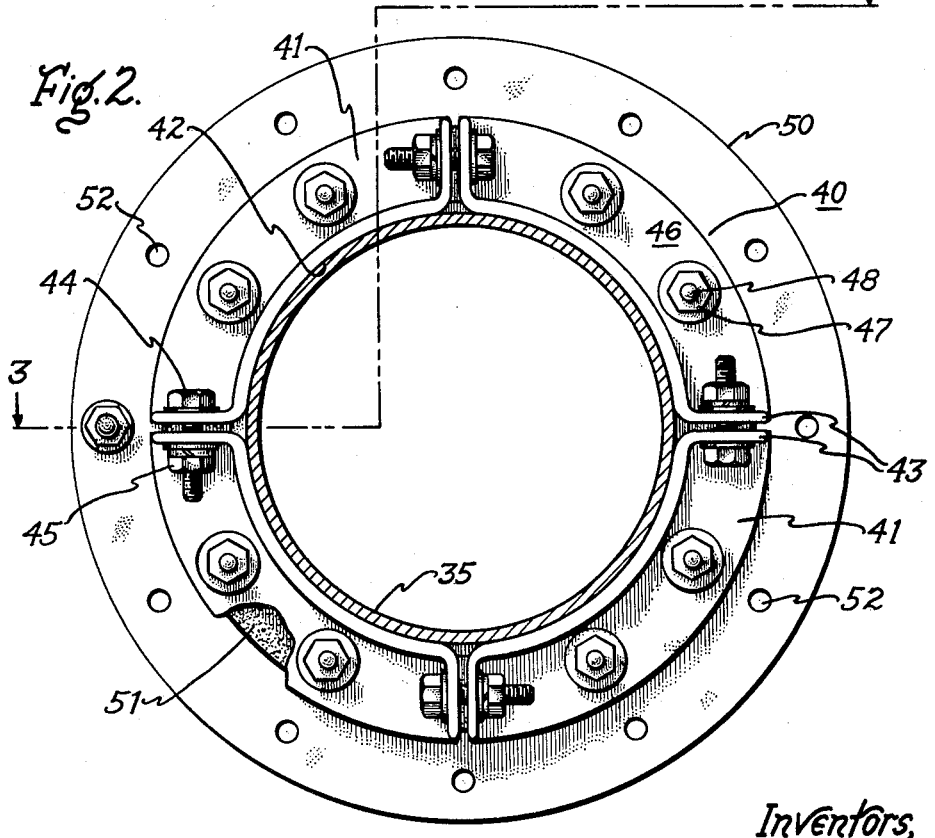

July 2, 1963  J. W. ALBRIGHT ET AL  3,096,391
BUS DUCT CONNECTION

Filed Dec. 27, 1960  3 Sheets-Sheet 3

Inventors,
John W. Albright,
Ernest E. Bianco,
by Gilbert P. Tarleton
Their Attorney.

United States Patent Office 3,096,391
Patented July 2, 1963

3,096,391
BUS DUCT CONNECTION
John W. Albright, Pittsfield, and Ernest E. Bianco, North Adams, Mass., assignors to General Electric Company, a corporation of New York
Filed Dec. 27, 1960, Ser. No. 78,349
3 Claims. (Cl. 174—18)

This invention relates to electrical power transmission systems, and more in particular to improved means for protecting high current buses that are employed in such systems.

Electrical power transmission systems generally comprise power generating means that produce electricity at relatively low voltage but relative high current. Such power generating means are connected to power transformers for increasing the voltage of the electrical power so that it can be economically passed through transmission lines over long distances. When the power has been transmitted to the area where it will be consumed, the transmission lines may be connected to another power transformer for stepping down the voltage. The step-down transformer may be connected to other electrical apparatus such as switchgear for safely handling the large currents produced at the lower voltage. Power transformers are electrically connected to power generating means and switchgear by large buses that are designed to transmit large currents at a minimum of power loss.

The power transformers employed in such systems are generally immersed in dielectric liquids for insulating and cooling purposes. The dielectric liquids present explosion or fire hazards, or both, and consequently safety regulations usually require that the transformers be located outside of buildings. Power generating equipment and switchgear, however, do not always present such a hazard, so they may often be located inside of a building. Consequently, the high current buses that connect the power transformers to the other electrical apparatus may pass through the building in which the other apparatus is located before reaching the power transformer. A portion of the bus connecting the other apparatus to the transformer must then pass through the open air between the building and the transformer. It is the generally accepted practice to protect the bus by surrounding it with duct means. The bus and duct surrounding it may extend horizontally from the building containing the other apparatus to a point substantially vertically aligned with the low voltage bushing of the power transformer. At such a point the bus and the duct may extend vertically downwardly to the bushing where electrical connection is made with the bus, and the duct may partially surround the bushing also. In order to insure that the duct around the bus and bushing is weather tight, the lower end of the duct is generally secured to mounting flanges connected to the top of the enclosure containing the power transformer. The above-described arrangement has given rise to problems which our invention has eliminated.

One problem has arisen because of the difficulties encountered in providing the transformer with mounting flanges at a proper height for connection to the bus duct. Many power transformers of a given power carrying capacity can be made to fit in enclosures of a given fixed height. However, other electrical apparatus such as power generating stations including the power generating means and the building it is located in are not uniform in dimension; in particular, the height above the ground at which the bus and its duct extend from the building vary widely. The prior art practice has been to secure the mounting flanges to the top of the transformer enclosure tank by welding. Consequently, the size of the flanges had to be varied for almost every transformer according to the height and dimensions of the bus duct to which they were to be connected. The result was that each power transformer had to be tailor-made to fit the size of the equipment to which it was to be connected. This increased the cost of the apparatus and led to difficulties in connecting the mounting flanges to the bus duct because the non-adjustable parts had to be very accurately aligned. This was difficult because power transformers weigh many tons and are not easily shifted for alignment of the parts. These problems are encountered when power transformers are connected by buses to any type of equipment which has a fixed bus height.

One previously known solution to these problems is to make the vertically extending portion of the bus duct from two members, one of which telescopes within the other so that the height of the duct is adjustable. This arrangement is undesirable, however, because of the difficulty of maintaining a tight seal around the bus and the current carrying part of the bushing. Also there is a danger of electrical stress concentrations at sharp corners or irregular surfaces on the telescoping duct members.

Accordingly it is an object of our invention to provide improved electrical apparatus.

Another object of our invention is to provide improved means for protecting a bus that connects electrical apparatus.

A further object of our invention is to provide adjustable means that eliminates the need for movable ductwork to protect a bus connecting a power transformer to other apparatus.

Another object of our invention is to provide a rugged yet economical arrangement for connecting a bus duct to a transformer.

Another object of our invention is to provide a power transformer having an adjustable connection for attachment to bus ducts over a wide range of heights.

Other objects and advantages of our invention will become apparent from the specification, drawings, and claims, and the scope of the invention will be pointed out in the claims.

According to one aspect of our invention, improved means may be provided for protecting a bus that connects a power transformer to other power equipment when a horizontally extending portion of a duct around the bus has a substantially non-adjustable height, and the power transformer is contained in an enclosure having a fixed height. The duct for protecting the bus may be connected to means that is vertically adjustable with respect to the transformer. The vertically adjustable means clampingly engages means that surrounds a portion of a low voltage bushing as it emerges from the transformer enclosure.

In the drawing:

FIGURE 2 is an enlarged cross-sectional bottom plan view taken in a plane parallel to the top of the enclosure tank with the plane including the line 2—2 in FIGURE 1, with some elements being omitted for clarity.

FIGURE 3 is a partially cross-sectional elevational view taken along the line 3—3 in FIGURE 2.

Figure 1:
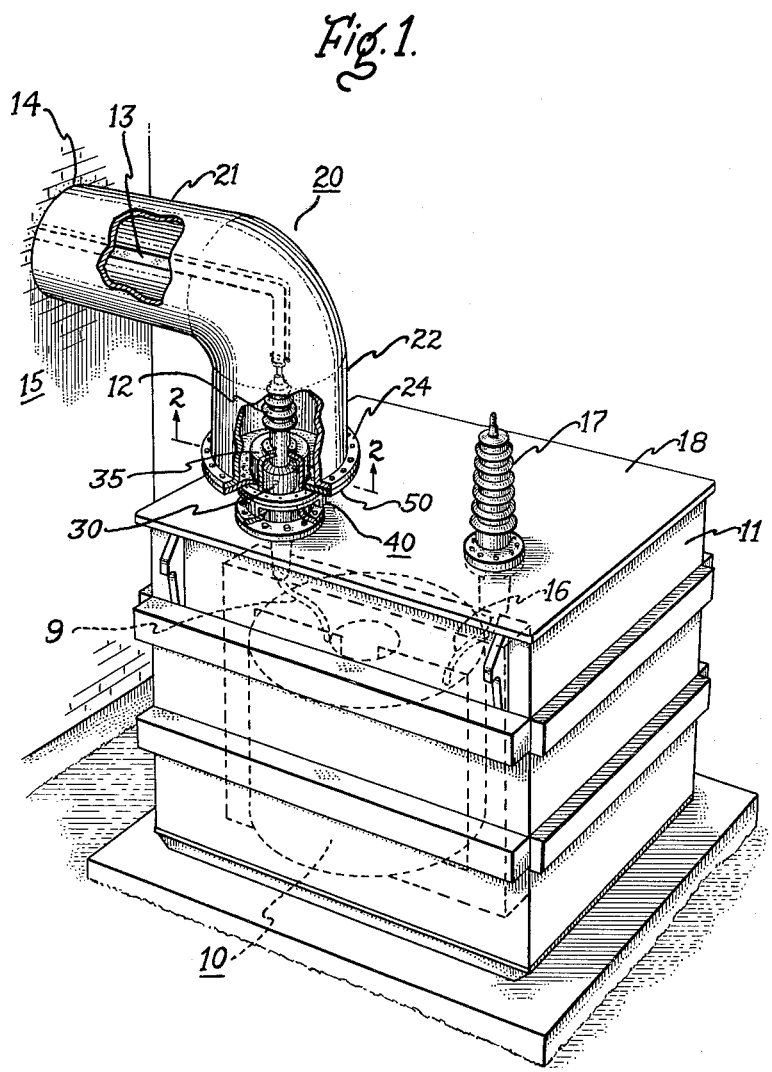
FIGURE 1 is a perspective partially broken-away view of apparatus in accord with our invention.

Our invention will now be explained by reference to the drawing. In FIGURE 1 a power transformer 10 is shown to be contained in an enclosure tank 11, which may be filled with a dielectric fluid in the conventional manner. A lead 9 from the transformer 10 is connected to a low voltage bushing 12, and the low voltage bushing is connected to a bus 13. The bus 13 may pass horizontally through an opening 14 in a building 15 and is connected to some other type of electrical apparatus, such as conventional power generating means (not illustrated). Another lead 16 from the transformer 10 may be connected to a high voltage bushing 17. The transformer 10 may be of the polyphase type, but only the leads, bushings, and bus connection for one isolated phase have been illustrated in FIGURE 1 for the purpose of simplifying the drawing.

The bus 13 may carry power at low voltage but high current from the other electrical apparatus to the transformer 10. To protect the bus 13 and also eliminate the necessity for employing heavy insulation, duct means 20 may be provided surrounding the bus 13. The duct means 20 may comprise a portion 21 that extends substantially horizontally from the building 15 to a point substantially vertically above the low voltage bushing 12. Another integral portion 22 of the duct means 20 may extend vertically from the horizontal portion 20 to just above the top 18 of the enclosure 11. Thus the duct means 20 may be a unitary structure in which irregular surfaces and sharp corners are minimized.

A rigid structure or member should be attached to the enclosure tank 11 at the lower end of the bushing 12 around the opening through which the bushing passes into the tank. For example, if a current transformer 30 is employed around the lower end of the bushing 12 in the conventional manner, a metallic housing 35 around the current transformer 30 would serve as the rigid structure, since the housing 35 would also enclose a portion of the bushing 12 on either side of the current transformer. The structure of the current transformer 30 and housing 35, and the manner of mounting them may be the same as that disclosed in United States Patent 2,994,845, which is assigned to the assignee of this invention. The housing 35 would then be removably mounted on the tank 11 by bolts extending upwardly from the top 18 of the tank 11 around the bushing 12. Means 40 may be provided for clampingly engaging the housing 35 and providing vertical adjustment in the height at which the duct portion 22 may be attached to the transformer 10.

Referring now to FIGURES 2 and 3, the structure of clamping means 40 that is circumferentially adjustable so as to exert clamping forces radially of the bushing is shown in greater detail. The bushing 12 and current transformer 30 have been omitted from FIGS. 2 and 3 to simplify the drawing. The clamping means 40 may comprise a plurality of angle-shaped elements 41, each of which has a surface 42 conforming in shape to that of the exterior of the housing 35. The elements 41 may have attaching flanges 43 aligned with each other and connected together by bolts 44 and nuts 45. This arrangement provides an economical yet rugged structure of adjustable diameter that can be easily loosened and vertically adjusted along the housing 35 and then secured in position by tightening the nuts 45. A horizontally extending portion 46 of the angle shaped elements 41 may be attached to a mounting plate 50. The mounting plate 50 may have a configuration substantially the same as a mounting flange 24 on the lower end of the duct portion 22. The mounting plate 50 may be attached to the horizontal portions 46 by nuts 47 and bolts 48. The openings 49 through which the bolts 48 pass should be larger in diameter than the bolts to facilitate tilting of the plate 50 into alignment with the flange 24. Openings 52 may be provided in the mounting plate 50 for registering with similarly located openings 52' in the flange 24 in order that the duct portion 22 may be removably connected to the mounting plate 50 by nuts and bolts. The mounting plate 50 has an opening 53 for receiving the housing 35. The opening 53 is larger than the outside dimension of the housing 35 to permit shifting of the plate 50 for alignment with the flange 24. Flexible gasket means 51, such as an apertured sheet of foam rubber, may be provided around the housing 35 between the horizontal portions 46 and plate 50 in order to obtain a weather tight seal. The gasket aperture 54 through which the housing 35 passes may be smaller than the housing to insure an efficient seal.

It will be apparent from the above-described structure that the mounting plate 50 may be both vertically and horizontally adjusted along the housing 35 so that it can be connected to the mounting flange 24 at the bottom of the duct means 20 over a wide range of heights at which buses extend above the ground. This arrangement enables transformers 10 of any given power carrying capacity to be fabricated on a mass production basis with a standardized height for the top 18 of their enclosure tanks 11. Our arrangement also eliminates the necessity for tailoring the dimensions of the mounting plate 50 to the exact height of the specific bus 13 and duct means 20 to which the transformer 10 is to be connected. Also a bus duct mounting arrangement in accord with our invention makes it much easier to connect the transformer to the bus duct because the mounting plate 50 may be rotated radially around the housing 35 or tilted slightly with respect thereto in order to properly align it with the mounting flange 24 on the duct portion 22. This eliminates difficulties encountered in prior art arrangements where the mounting flange for connection with a bus duct was rigidly attached to the transformer enclosure 11.

Figure 4:
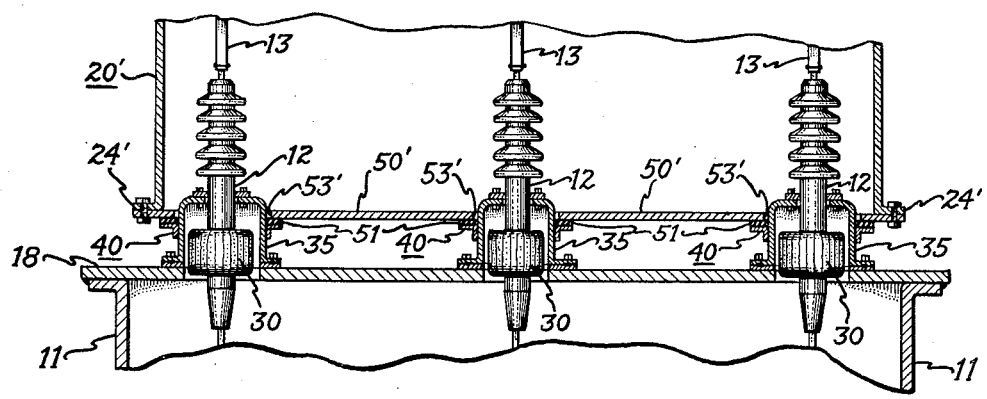
FIGURE 4 is a partially cross-sectional view showing another embodiment of our invention.

When it is not necessary to isolate the bus to each phase of a transformer, a single large duct 20' may be employed to protect a plurality of buses in a polyphase system. This embodiment of our invention is illustrated in FIG. 4, where a plurality of buses 13 are shown to be connected to a plurality of bushings 12, each of which is connected to a different phase of a transformer (not illustrated). Each bushing 12 may be surrounded by a current transformer 30 and its housing 35 in the same manner as the embodiment of FIG. 1. Each housing 35 may be surrounded by adjustable clamping means 40 identical to that shown in FIGS. 2 and 3. In the embodiment of FIG. 4, however, the clamping means 40 are bolted to a large plate 50' that has several openings 53' that enable it to pass over all of the housings 35. Large duct means 20' is employed for simultaneously protecting the bus for each phase, and the duct means 20' has a flange 24' in its lower end that may be attached to the plate 50' in the same manner as in the embodiment of FIGS. 1–3. The adjustable nature of our duct connecting arrangement is even more advantageous in this embodiment because the previously mentioned difficulties in aligning the transformer with a rigid duct are obviously increased when several phases are enclosed by a large duct.

It will be understood, of course, that while the forms of the invention herein shown and described constitute preferred embodiments of the invention, it is not intended herein to illustrate all of the equivalent form or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. In an electrical power transmission system employing a power transformer having a low voltage bushing connected by a power carrying bus to other electrical apparatus, said bus extending substantially horizontally from said other electrical apparatus for at least a portion of its length, the height of said bus above the ground being substantially fixed, and said transformer being contained in an enclosure having a fixed height, the improvement in means for protecting said bus comprising duct means enclosing said bus and bushing, a housing surrounding a portion of said bushing at the end that passes through said enclosure, clamping means comprising a plurality of angle shaped elements adjustably connected to each other, a portion of said angle elements clampingly encompassing said housing so as to be vertically adjustable therealong, and said clamping means having a flange connected to said duct means.

2. In an electrical power transmission system employing a power transformer having a low voltage bushing connected by an isolated power carrying bus to other electrical apparatus, said bus extending substantially horizontally from said other electrical apparatus for at least a portion of its length, the height of said bus above the ground being substantially non-adjustable, and said transformer being contained in an enclosure having a fixed height, the improvement in means for protecting said bus comprising duct means enclosing said bus and bushing, said duct means having a flange at the lower end thereof, a current transformer housing surrounding a portion of said bushing at the end that passes through said enclosure, clamping means comprising a plurality of angle shaped elements adjustably connected to each other, a portion of said angle elements clampingly encompassing said current transformer housing so as to be vertically adjustable therealong, another portion of said angle elements being connected to an annular plate surrounding said housing, and said annular plate being removably connected to the flange on said duct means.

3. In a polyphase electrical power transmission system employing a power transformer having a plurality of low voltage bushings connected by power carrying buses to other electrical apparatus, said buses extending substantially horizontally from said other electrical apparatus for at least a portion of their length, the height of said buses above the ground being substantially non-adjustable, and said transformer being contained in an enclosure having a fixed height, the improvement in means for protecting said buses comprising duct means enclosing all of said buses and bushings, said duct means having a flange at the lower end thereof, current transformer housings surrounding a portion of each of said bushings at the ends that pass through said enclosure, clamping means around each bushing comprising a plurality of angle shaped elements adjustably connected to each other, a portion of the angle shaped elements of each clamping means clampingly encompassing said current transformer housings so as to be vertically adjustable therealong, plate means having openings receiving each current transformer housing, another portion of the angle shaped elements of each clamping means being connected to said plate means, and said plate means being removably connected to the flange on said duct means.

References Cited in the file of this patent

UNITED STATES PATENTS

| | | |
|---|---|---|
| 1,768,522 | Brown | June 24, 1930 |
| 1,819,302 | Rah | Aug. 18, 1931 |
| 1,859,955 | Burnham | May 24, 1932 |
| 1,862,254 | Christie | June 7, 1932 |
| 2,041,250 | Kalwitz | May 19, 1936 |
| 2,264,816 | Treanor | Dec. 2, 1941 |
| 2,452,947 | Meyerhans | Nov. 2, 1948 |